US008984300B2

(12) United States Patent
Borchert et al.

(10) Patent No.: US 8,984,300 B2
(45) Date of Patent: Mar. 17, 2015

(54) SECURE OPERATION OF PROGRAMMABLE DEVICES

(75) Inventors: Joerg Borchert, Los Gatos, CA (US); Jurijus Cizas, Castro Valley, CA (US); Shrinath Eswarahally, Sunnyvale, CA (US); Mark Stafford, San Carlos, CA (US); Rajagopalan Krishnamurthy, Cupertino, CA (US)

(73) Assignee: Infineon Technologies AG, Neubiberg (DE)

( * ) Notice: Subject to any disclaimer, the term of this patent is extended or adjusted under 35 U.S.C. 154(b) by 869 days.

(21) Appl. No.: 12/363,903

(22) Filed: Feb. 2, 2009

(65) Prior Publication Data

US 2010/0083384 A1 Apr. 1, 2010

Related U.S. Application Data

(60) Provisional application No. 61/101,441, filed on Sep. 30, 2008.

(51) Int. Cl.

*G06F 11/30* (2006.01)
*H03K 19/177* (2006.01)
*G06F 21/57* (2013.01)

(52) U.S. Cl.

CPC ........ *H03K 19/17768* (2013.01); *G06F 21/572* (2013.01); *G06F 2221/2105* (2013.01); *G06F 2221/2141* (2013.01)

USPC .......................................... 713/190; 713/189

(58) Field of Classification Search

CPC ....................................................... G06F 21/00
USPC ................ 713/182, 100, 189; 726/17, 26–27; 711/163; 326/39; 380/277, 281

See application file for complete search history.

(56) References Cited

U.S. PATENT DOCUMENTS

| | | | | |
|---|---|---|---|---|
| 6,654,889 | B1 | 11/2003 | Trimberger | |
| 6,919,736 | B1 * | 7/2005 | Agrawal et al. | 326/41 |
| 7,062,616 | B2 | 6/2006 | Sadhasivan et al. | |
| 7,134,025 | B1 | 11/2006 | Trimberger | |
| 7,191,342 | B1 * | 3/2007 | New et al. | 713/190 |
| 7,193,439 | B1 | 3/2007 | Jenkins, IV | |
| 7,203,842 | B2 | 4/2007 | Kean | |
| 7,227,378 | B2 * | 6/2007 | Blodget et al. | 326/38 |

(Continued)

OTHER PUBLICATIONS

Jensen, David et al., "Secure Reconfigurable Computing", Jul. 5, 2003, [Retrieved from Internet May 5, 2011], "klabs.org/richcontent/MAPLDCon99/Presentations/F3_Jensen_S.PDF".*

(Continued)

*Primary Examiner* — Christopher Brown
*Assistant Examiner* — Roderick Tolentino
(74) *Attorney, Agent, or Firm* — Murphy, Bilak & Homiller, PLLC

(57) ABSTRACT

According to an embodiment, a programmable logic device includes a plurality of logic blocks, memory, a plurality of connection control elements and a logic unit. The logic blocks are grouped into one or more programmed partitions. The memory stores authentication information and partition information. The connection control elements controllably interconnect different ones of the logic blocks. The logic unit controls external access to the one or more partitions based on the authentication information, controls reprogramming of the one or more partitions based on at least some of the partition information and configures the connection control elements based on at least some of the partition information.

27 Claims, 6 Drawing Sheets

FMU 114
PARTITION INFORMATION 120
AUTHENTICATION AND ENCRYPTION KEY(S) 116
118
112
100
106
104
106
110
102
108

(56) References Cited

U.S. PATENT DOCUMENTS

| | | | | |
|---|---|---|---|---|
| 7,366,306 | B1 * | 4/2008 | Trimberger | 380/278 |
| 7,550,994 | B1 | 6/2009 | Camarota et al. | |
| 7,702,927 | B2 | 4/2010 | Devadas et al. | |
| 8,819,409 | B2 * | 8/2014 | Kuipers et al. | 713/150 |
| 8,848,905 | B1 * | 9/2014 | Hamlet et al. | 380/35 |
| 2001/0047509 | A1 | 11/2001 | Mason et al. | |
| 2002/0199110 | A1 * | 12/2002 | Kean | 713/189 |
| 2003/0145203 | A1 | 7/2003 | Audebert et al. | |
| 2004/0177269 | A1 * | 9/2004 | Belnet et al. | 713/200 |
| 2004/0197073 | A1 * | 10/2004 | Oesterreicher et al. | 386/46 |
| 2006/0248329 | A1 | 11/2006 | Swanson et al. | |
| 2007/0192830 | A1 | 8/2007 | O'Connor | |
| 2007/0260885 | A1 * | 11/2007 | Yegani et al. | 713/171 |
| 2008/0005409 | A1 * | 1/2008 | Kolokowsky et al. | 710/62 |
| 2008/0104403 | A1 | 5/2008 | Gueron | |
| 2008/0109662 | A1 * | 5/2008 | Natarajan et al. | 713/193 |
| 2008/0155276 | A1 * | 6/2008 | Chen et al. | 713/193 |
| 2009/0300710 | A1 | 12/2009 | Chai et al. | |
| 2010/0050241 | A1 * | 2/2010 | Yan et al. | 726/5 |

OTHER PUBLICATIONS

Huffmire, Ted et al., "Designing Secure Systems on Reconfigurable Hardware", Jul. 2008, [Retrieved from Internet Apr. 22, 2011], "http://cseweb.ucsd.edu/~kastner/papers/todaes08-design__secure.pdf".*

Ullmann, Michael et al., "An FPGA Run-Time System for Dynamical On-Demand Reconfiguration", Jul. 7, 2004, [Retrieved from Internet May 5, 2011], "ieeexplore.ieee.org/iel5/9132/28950/01303106.pdf".*

Lattice Semiconductor Corporation White Paper, "FPGA Design Security Issues: Using Lattice FPGAs to Achieve High Design Security", Sep. 2007, [Retrieved from Internet Jun. 6, 2011], "http://www.latticesemi.com/documents /doc18329x45.pdf".*

Astarloa, Armando et al., "Tornado: A self-reconfiguration control system for core-based multiprocessor CSoPCs", May 26, 2006, [Retrieved from Internet Nov. 17, 2011], "http://www.sciencedirect.com/science/article/pii/S1383762107000021".*

Alkabani, Yousra et al., "Active Control and Digital Rights Management of Integrated Circuit IP Cores", Oct. 19, 2008, [Retrieved from Internet Nov. 15, 2011], "http://www.cecs.uci.edu/~papers/esweek08/cases/p227.pdf".*

Kepa, Krzysztof et al., "SeReCon: a Secure Dynamic Partial Reconfiguration Controller", Apr. 7, 2008, [Retrieved from Internet Nov. 16, 2011], "http://ieeexplore.ieee.org/stamp/stamp.jsp?tp=&arnumber=4556810".*

Candiloro, Davide, "Management and Analysis of Bitstreams Generators for Xilinx FPGAs", May 20, 2008, [Retrieved from Internet Nov. 16, 2011], "http://www.dresd.org/files/UIC__Candiloro__Thesis.pdf".*

Jensen, David et al., "Secure Reconfigurable Computing", Jul. 5, 2003, [Retrieved from Internet May 5, 2011], "klabs.org/richcontent/MAPLDCon99/Presentations/F3__Jensen S.PDF".*

Huffmire, Ted et al., "Designing Secure Systems on Reconfigurable Hardware", Jul. 2008, [Retrieved from Internet Apr. 22, 2011 ], "http://cseweb.ucsd.edu/~kastner/papers/todaesO8-desig n__secure.pdf".*

Braeckman, G. et al. "Module Based Partial Reconfiguration: A Quick Tutorial." IWT HOBU-Fonds Project 030153, Erasmushogeschool Brussel, Jul. 2004. Available online at: http://rapptor.iwt.ehb.be/index.php?id=232.

Butel, P. et al. "Managing Partial Dynamic Reconfiguration in Virtex-II Pro FPGAs." Xcell Journal, Fall 2004. Available online at: http://www.xilinx.com/publications/xcellonline/xcell__50/xc__pdf/xc__mbda50.pdf.

Conger, C. "Partial Reconfiguration." Lecture Slides, University of Florida, Nov. 2007. Available online at: http://www.gstitt.ece.ufl.edu/courses/eel4930__5934/lectures/partial__reconfig.ppt.

Cosoroaba, A. et al. "Achieving Higher System Performance with the Virtex-5 Family of FPGAs." XILINX White Paper, Jul. 2006. Available online at: http://www.xilinx.com/support/documentation/white__papers/wp245.pdf.

Eto, E. "Difference-Based Partial Reconfiguration." XILINX White Paper, Dec. 2007. Available online at: http://www.xilinx.com/support/documentation/application__notes/xapp290.pdf.

Kao, C. "Benefits of Partial Reconfiguration." Xcell Journal, Fourth Quarter 2005. Available online at: http://www.xilinx.com/publications/xcellonline/xcell__55/xc__pdf/xc__reconfig55.pdf.

Kean, T. "Cryptographic Rights Management of FPGA Intellectual Property Cores." FPGA 2002, Feb. 24-26, 2002, Monterey, CA, US. Available online at: http://www.algotronix.com/content/security%20fpga2002.pdf.

Lesea, A. "IP Security in FPGAs." XILINX White Paper, Feb. 2007. Available online at: http://www.xilinx.com/support/documentation/white__papers/wp261.pdf.

Zeh, C. "Incremental Design Reuse with Partitions." XILINX White Paper, Jun. 2007. Available online at: http://www.xilinx.com/support/documentation/application__notes/xapp918.pdf.

Zeineddini, A. H. S. "Secure Partial Reconfiguration of FPGAs." Thesis Submitted to the Graduate Faculty of George Mason University in Partial Fulfillment of the Requirements for the Degree of Master of Science Electrical and Computer Engineering. Summer 2005. Available online at: http://teal.gmu.edu/courses/Crypto__resources/web__resources/theses/GMU__theses/Zeineddini/Zeineddini__Summer__2005.pdf.

Zeineddini, A. H. S., et al. "Secure Partial Reconfiguration of FPGAs." 2005 IEEE International Conference on Field-Programmable Technology. Dec. 11-14, 2005, Singapore, pp. 155-162.

Linke, B., "Xilinx FPGA IFF Copy Protection with 1-Wire SHA-1 Secure Memories." Maxim Application Note, Jun. 21, 2006, pp. 1-4, Maxim.

Unknown, Author, "Chapter 15—Protecting FPGA Designs." Xilinx Spartan-3 Generationin Configuration User Guide, V. 1.6, Oct. 26, 2009.

Huffmire, T., et al., "Moats and Drawbridges: An Isolation Primitive for Reconfigurable Hardware Based Systems." IEEE Symposium on Security and Privacy, May 20-23, 2007, pp. 281-295, Bekeley.

* cited by examiner

SECURE OPERATION OF PROGRAMMABLE DEVICES

CROSS REFERENCE TO RELATED APPLICATIONS

This application claims the benefit of U.S. Provisional Application No. 61/101,441 filed on Sep. 30, 2008, which is incorporated herein by reference in its entirety.

BACKGROUND

Programmable devices such as FPGAs (field programmable gate arrays) are devices that can be designed and programmed via programming tools to operate in a wide variety of applications. Programmable devices include logic elements and interconnect resources that can be configured as necessary to operate in a particular application. The logic elements and interconnect resources are configured in collections known as logic blocks, which often times perform a specific function. Programmable devices also typically include other resources such as Random Access Memory (RAM) and other predefined blocks of logic such as a Digital Signal Processor (DSP), a Central Processing Unit (CPU), adders, multipliers, etc. During operation of the programmable device, the logic blocks and other resources are often shared by multiple logic elements.

Designs are typically partitioned into separate functional modules that include many logic blocks. Some of the functional modules may be purchased or licensed from a vendor for integration with other functional modules into the programmable device. These intellectual property modules often have certain rights and restrictions. In addition, many applications require a certain degree of system security and integrity. Functional modules employed in these types of applications have stricter security and integration requirements than those that are not since weaknesses and vulnerabilities can compromise the security and integrity of the system that they serve.

Many applications require secure programming and operation of programmable logic devices. For example, in certain applications, it is necessary to reprogram or upgrade a functional module regardless of whether the programmable device is operating or not. During operation of the programmable device, it may also be necessary to enable and/or disable different functional modules without affecting other functional modules. Also, suppliers of functional modules need to protect their intellectual property when integrated with other functional modules in a third-party design. There may be a need to identify and be compensated for each instance or use of a vendor's intellectual property. These and other security and system integrity functions present various challenges during different phases of programmable device development and use. Security breaches can occur during the design, programming and operation of a programmable device absent sufficient mechanisms for protecting the functional modules included in the device.

SUMMARY

According to an embodiment, a programmable logic device includes a plurality of logic blocks and a logic unit. The logic blocks are grouped into one or more partitions. The logic unit controls external access to the one or more partitions, controls programming of the one or more partitions and controls interconnection and operation of the one or more partitions during operation of the programmable logic device.

Those skilled in the art will recognize additional features and advantages upon reading the following detailed description, and upon viewing the accompanying drawings.

DETAILED DESCRIPTION

Secure programmable logic devices and methods of designing, programming and operating the same are disclosed herein. The integrity and security of functional modules embodied within a programmable logic device such as an FGPA are securely maintained throughout the design, programming and operation of the device. To provide and maintain the security and integrity of the functional modules, programmable device and system as a whole, logic blocks associated with the different functional modules are grouped into one or more partitions. Each partition includes a plurality of logic blocks which can be programmed to perform different functions. The programmable device authenticates access rights before permitting programming access to the different partitions. In addition, the programmable device controls partition programming so that various partition requirements are satisfied. This way, the security and integrity of the programmable device is not compromised during partition programming. The programmable device also controls and monitors the interconnection and communication between the partitions so that the partition requirements are also satisfied during operation and re-programming of the device. Accordingly, system security is automatically maintained throughout the design, programming and operation of the programmable device.

The programmable device can also automatically maintain security between partition interconnections to protect proprietary data. This way, some partitions can be prevented from connecting to, observing, driving or otherwise interfacing with other partitions when secure data is involved. In addition, the programmable device can isolate, protect and control access to shared resources such as RAM, DSPs, CPUs, adders, multipliers, etc. The programmable device also automatically manages the isolation and re-programming of partitions during normal device operation as well as enabling and disabling different ones of the partitions during normal operation all while maintaining system security and integrity. Furthermore, the programmable device can track the use of different IP (intellectual property) modules for which a per-use license or other fee arrangement may be owed.

Figure 1:
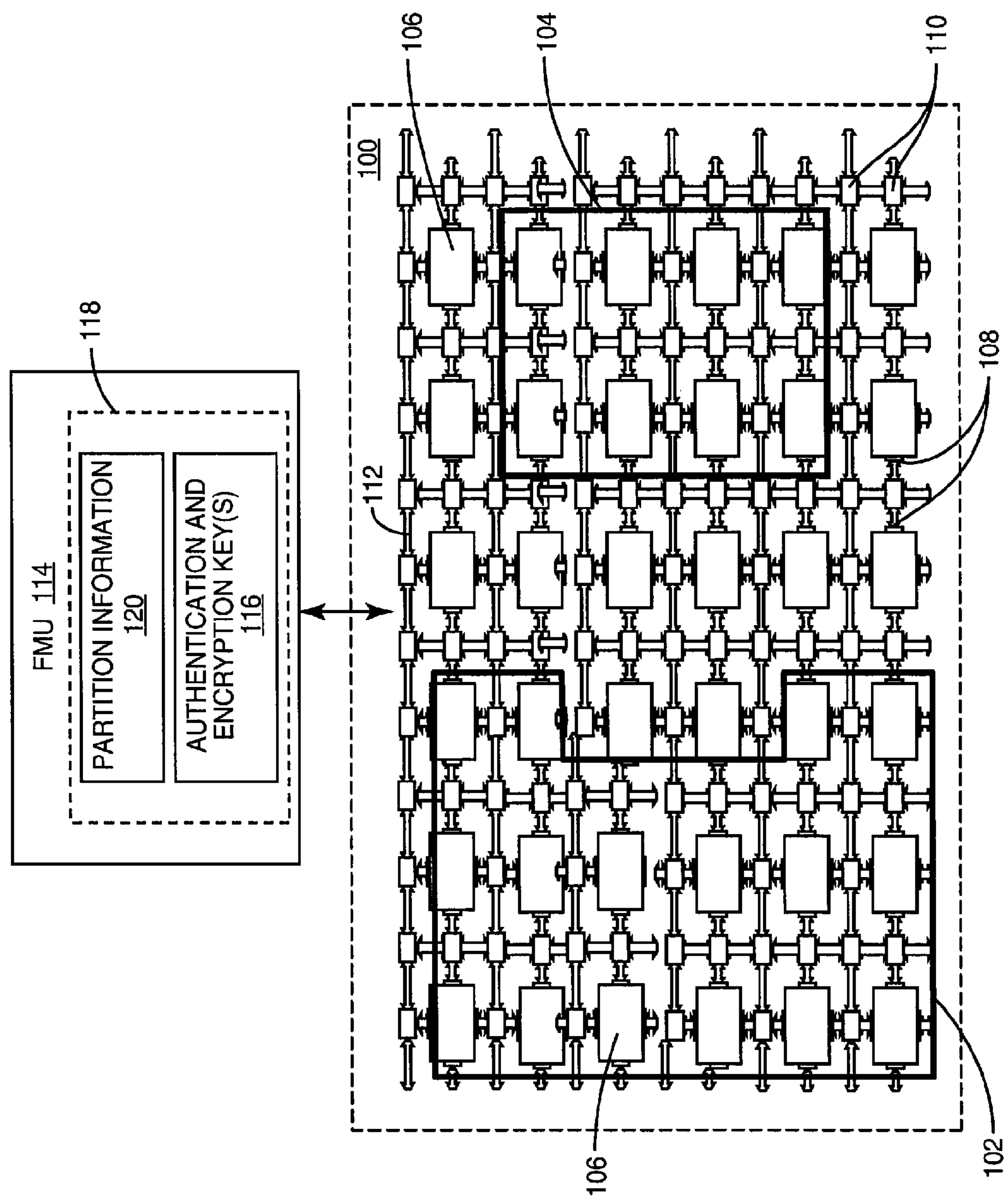
FIG. 1 illustrates an embodiment of a secure programmable logic device.

FIG. 1 illustrates an embodiment of a secure programmable logic device 100. The device 100 includes one or more different partitions 102, 104 of logic blocks 106. FIG. 1 shows two partitions 102, 104, but the device 100 may include any suitable number of partitions. The logic blocks 106 are coupled to communication control elements (CCEs) 108 for interfacing to other logic blocks 106 via switch elements 110. Interconnections 112 between the switch elements 110 can be single-wire or bus-based connections or some combination of both. In each case, programming access to the partitions 102, 104 as well as actual partition programming are controlled by a logic unit 114 included in or associated with the programmable device 100. The logic unit 114 can be included in the programmable device 100 or external to the device 100. The logic unit is referred to herein in abbreviated form as FMU (fabric management unit). The FMU 114 also controls the interconnection and operation of the partitions 102, 104 during operation of the programmable logic device 100. Accordingly, system security and integrity is maintained during the design, programming and operation of the programmable device 100.

The FMU 114 controls programming access to the partitions 102, 104 based on authentication information 116 stored by a memory component 118 included in or associated with the programmable device 100 such as ROM (read-only memory), flash memory, register or other type of volatile or non-volatile memory component. In other embodiments, the authentication information 116 is requested from or provided by a source external to the programmable device 100. In one embodiment, the authentication information 116 includes a secure key associated with each entity permitted to program one or more of the partitions 102, 104. Programming access to a secure partition is granted when possession of a proper key for that partition is verified by the FMU 114, e.g., by looking the key up in the memory 118 and performing any authentication mechanism involving the stored key associated with the secure partition. The authentication process can be skipped when an entity seeks programming access to an unsecure partition.

After successful authentication, the corresponding secure partition can be programmed. In one embodiment, programming data is provided to the programmable device 100 in encrypted form. According to this embodiment, the authentication information 116 stored in the memory 118 includes one or more encryption keys for decrypting the programming data. In either case, the partition 102, 104 for which access is granted is then programmed. The memory 118 also stores partition information 120 used by the FMU 114 to control how the partitions 102, 104 can be programmed, including bounds checking, as will be described in more detail later. The FMU 114 also uses the partition information 120 to control the interconnection and operation of the partitions 102, 104 during programming and operation of the programmable device 100 to maintain security and integrity between the partitions 102, 104 during programming and operation. For example, the first partition 102 can be operating while the second partition 104 is being reprogrammed. In this case, the FMU 114 controls the interconnect 112 between the partitions 102, 104 so that the first partition 102 is isolated.

Figure 2:
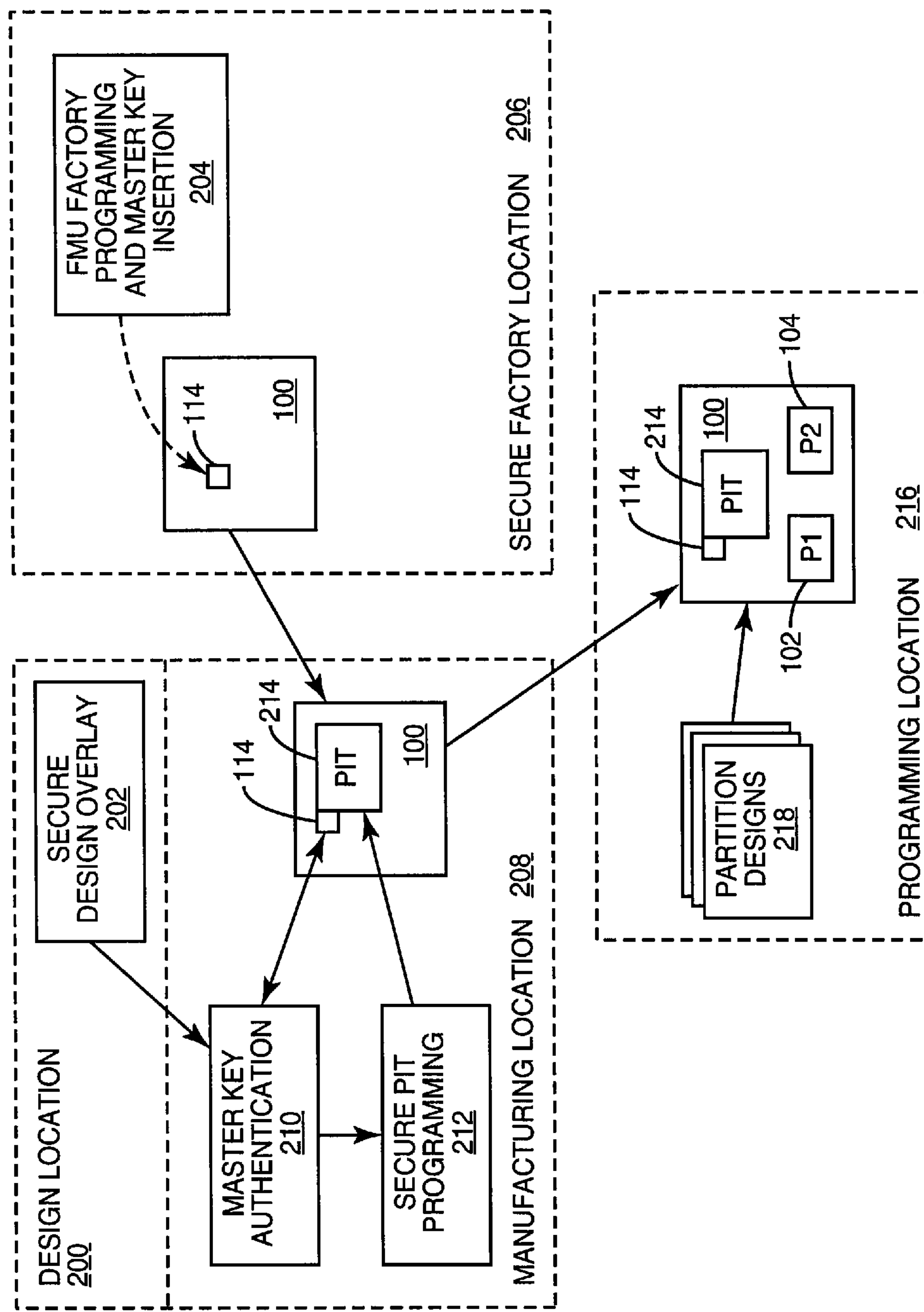
FIG. 2 illustrates a secure programmable logic device during different phases of design, programming and operation.

FIG. 2 illustrates an embodiment of a methodology for designing secure partitions 102, 104, preparing the programmable device 100 to accept the secure partitions 102, 104, creating the partition information 120 and programming the device 100. The partitions 102, 104 can be formed in a secure design environment 200 from one or more contiguous collections of logic blocks 106. Two or more interconnected partitions 102, 104 can be arranged adjacent to one another or physically separated. The secure design is then overlaid on the programmable device 100 to generate a secure design overlay 202. The FMU 114 is then programmed 204 at a secure factory location 206. In one embodiment, the programmable device 100 is also provided with a master authentication key. The master authentication key is used at a manufacturing or customer location 208 to control which entity or entities are permitted to program the partition information 120 into the FMU 114. After the master key is authenticated 210, partition information programming is permitted 212. Authentication keys for enabling further partition programming can also be provided now or earlier in the process. At this point in the process, the programmable device 100 has been securely partitioned and programmed with information that controls programming (and re-programming) access to the partitions 102, 104 and how the different partitions 102, 104 can be programmed (and re-programmed). In one embodiment, the partition information 120 is stored in a partition information table 214 included in or associated with the programmable device 100. The authentication and partition information 116, 120 are subsequently used at a programming location 216 to program the device 100 with one or more partition designs 218. The FMU 114 uses the authentication information 116 to determine whether the programming device is permitted to access any of the partitions 102, 104. If so, partition programming commences and is controlled by the FMU 114 based on the partition information 120 stored in the partition information table 214. The authentication and partition information 116, 120 is also used by the FMU 114 to control the interconnection and operation of the partitions 102, 104 during operation of the programmable logic device 100 and reprogramming and reconfiguration of the device 100.

In one embodiment, the FMU 114 is a collection of circuits implemented in one of many ways to perform various authentication and security functions. The authentication and partition information 116, 120 used by the FMU 114 to maintain system security and integrity can be locally stored by the FMU 114 or by a different memory component of the programmable device 100. In either case, the FMU 114 stores, protects and uses master and/or other key information for performing authentication and programming data decryption. The FMU 114 can interact with external programming devices to verify programming rights for partition data using the key information. The FMU 114 can also authenticate external programming devices and permit the devices to provide or update the partition information 120 or portions of the partition information 120 after being verified. This way, the partition information 120 is safely and securely downloaded, stored, protected and retrieved under control of the FMU 114.

The FMU 114 uses the partition information 120 during device programming and operation. Accordingly, some portions of the partition information 120 may pertain to device programming (and re-programming) while other portions of the partition information 120 may pertain to actual device operation. During partition programming, the FMU 114 enforces the programming rules specified by the partition information 120. For example, the FMU 114 can enforce access rights to allow or prevent programming of particular partitions 102, 104. The FMU 114 can also validate partition programming data and prevent programming or re-programming responsive to errors or violations. In one embodiment, this includes bounds checking to ensure that programming data associated with one of the partitions 102, 104 to be programmed is confined to the area of the programmable device 100 allocated to that partition and prevents the programming data from flowing through to other partitions 102, 104. The FMU 114 can also protects the interconnect privacy between partitions 102, 104 during the programming process. In one embodiment, the partition information 120 includes an "Interconnect Configuration Mask" which identifies specific common resources in the programmable device 100 which are reserved for specific ones of the partitions 102 104. The FMU 114 uses the Interconnect Configuration Mask to ensure that configuration streams for other partitions 102, 104 do not violate the reservations indicated by the Mask. The partition information 120 may also indicate which partitions 102, 104 can be fully or partially reconfigured and which ones cannot. The FMU 114 uses the reconfiguration information to prevent reprogramming of protected partitions or protected partition functions. The reconfiguration information can also indicate the number of reconfiguration attempts which are permitted. The FMU 114 prevents additional reconfiguration attempts once the limit is reached.

During operation of the programmable device 100, the FMU 114 enforces the operating rules specified by the partition information 120. The FMU 114 can isolate partitions 102, 104 from one another based on certain ones of the programming rules. The FMU 114 can also isolate partitions 102, 104 from programmable device I/O (input/output) and or from shared resources of the programmable device 100 such as memory, DSP, CPU, etc. The FMU 114 also uses the operating rules to resolve shared resource access rights and criteria. Accordingly, the FMU 114 is aware of the structure of the programmable device 100 and can be implemented in a centralized or distributed manner. The FMU 114 can be partly or fully located within the programmable device 100 or located externally to the device 100 and can be implemented in hardware, software, firmware or any suitable combination thereof.

Figure 3:
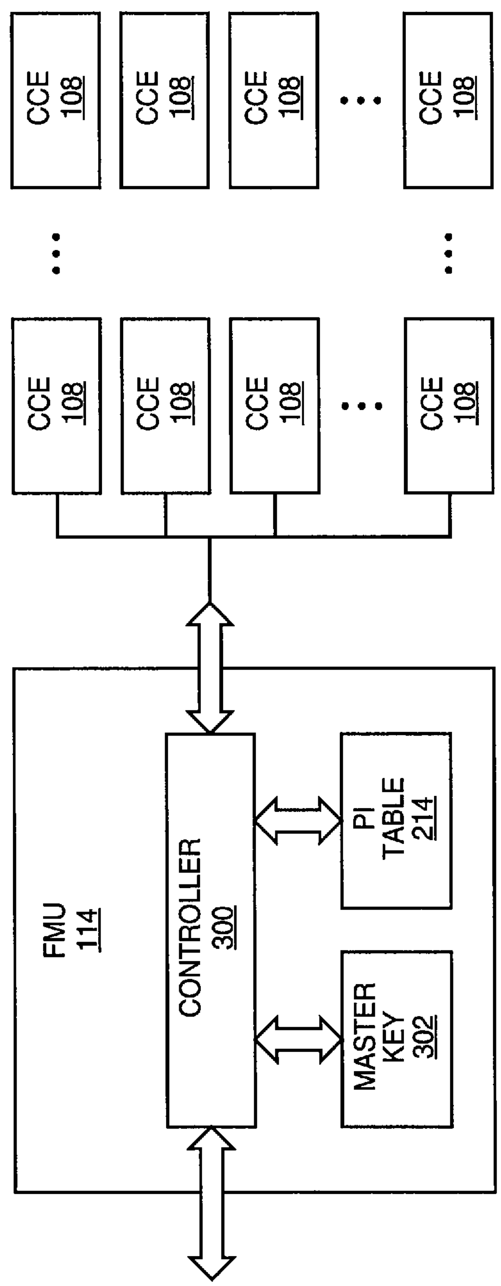
FIG. 3 illustrates an embodiment of a logic unit and communication control elements associated with a secure programmable logic device.

FIG. 3 illustrates an embodiment of the FMU 114. According to this embodiment, the FMU 114 includes a controller 300, a master key table 302 and the partition information table 214. The controller 300 performs authentication based on the information stored in the master key table 302 and enforces the rules indicated by the information stored in the partition information table 214. Information stored in the partition information table 214 is collected during the design phase and formatted appropriately for loading into the partition information table 214. In one embodiment, the FMU 114 permits a programming device having an authenticated key to download partition information 120 into the partition information table 214. The partition information table 214 includes information about the programmable logic device 100 and information specific to each partition 102, 104 which allows the FMU 114 to implement various security and control functions, e.g., as described above.

The master key table 302 includes information used by the FMU 114 to protect the partition information table 214 from unauthorized programming or re-programming. The FMU 114 uses one or more master keys stored in the master key table 302 to authenticate programming devices attempting to upload information to the partition information table 214. The master key(s) can be implemented according to any symmetric or asymmetric crypto algorithm rules.

The FMU controller 300 interfaces with the different CCEs 108. The CCEs 108 are coupled between the logic blocks 106 and the interconnection switch elements 110 of the programmable device 100. The switch elements 110 can be any suitable devices for connecting the logic blocks 106 such as switches, etc. The CCEs 108 isolate the communication paths between the logic blocks 106. The CCEs 108 are controlled by the FMU 114 and/or fabric monitoring elements (FMEs) included in the programmable device 100.

Figure 4:
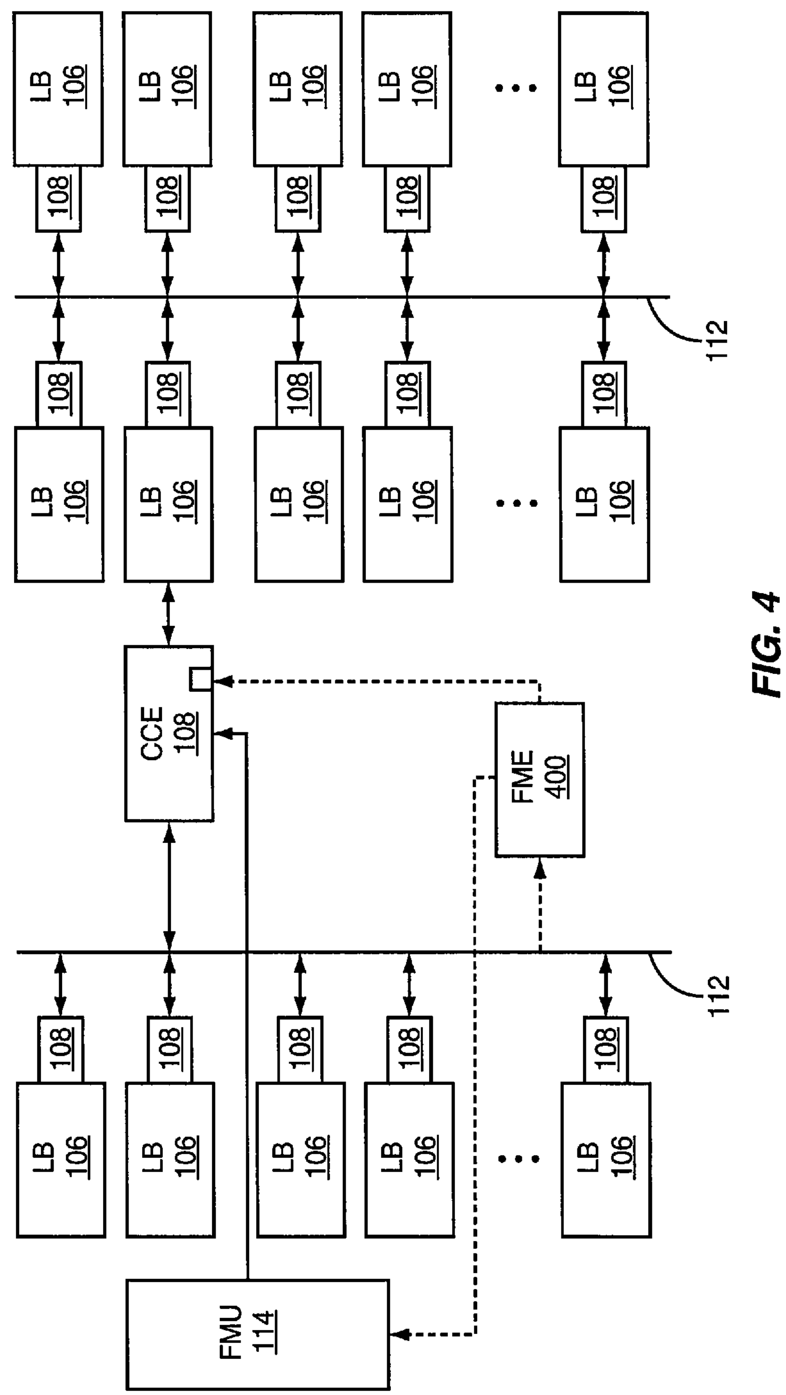
FIG. 4 illustrates an embodiment of a logic unit, communication control elements and monitoring elements associated with a secure programmable logic device.

FIG. 4 illustrates an embodiment of the interconnections between the FMU 114, CCEs 108 and FMEs 400. The CCEs 108 provide an interface between the logic blocks 106 and the network interconnect features 112 included in the programmable device 100. The interconnect networks 112 can be single-wire or bus-based. In one embodiment, each CCE 108 connects to a respective logic block 106 at one interface and to a switching device 110 embedded in the interconnect network 112 at another interface. Accordingly, the CCEs 108 control communication flow between the logic blocks 106 and interconnect networks 112. The CCEs 108 can be a single-transistor switch or more complex logic structures. The CCEs 108 can be controlled by the FMU 114 and/or the FMEs 400. Either way, the CCEs 108 at least partly implement the partition rules provided to the programmable device 100 by configuring the interconnections between the logic blocks 106 and the interconnect networks 112 based on the partition information 120. The FMEs 400 are distributed throughout the programmable device 100 and monitor various operational aspects of the programmable device 100.

In one embodiment, the FMEs 400 assist the FMU 114 in monitoring operational integrity of the programmable device 100. The FMEs 400 can be coupled to the interconnect networks 112, CCEs 108 and/or the logic blocks 106 and can be implemented at the logic block level and/or the partition level depending on the type of operations being monitored. In one embodiment, one or more of the FMEs 400 report to the FMU 114 whether a partition 102, 104 attempts to access an interconnect network 112 or another partition to which the partition is not permitted access as indicated by the partition information 120 stored in the partition information table 214. In another embodiment, one or more of the FMEs 400 monitor physical operating conditions of the programmable device 100 such as temperature, voltage, current, power, etc. The FMEs 400 can also monitor partition programming activity to ensure no unauthorized re-programming or tampering occurs during operation of the programmable device 100. The FMEs 400 report to the FMU 114 when a condition is detected. The FMEs 400 can be programmed by the FMU 114, e.g., based on the partition information 120 uploaded to the programmable device 100. Alternatively, the FMEs 400 can be programmed by an external entity.

Figure 5:
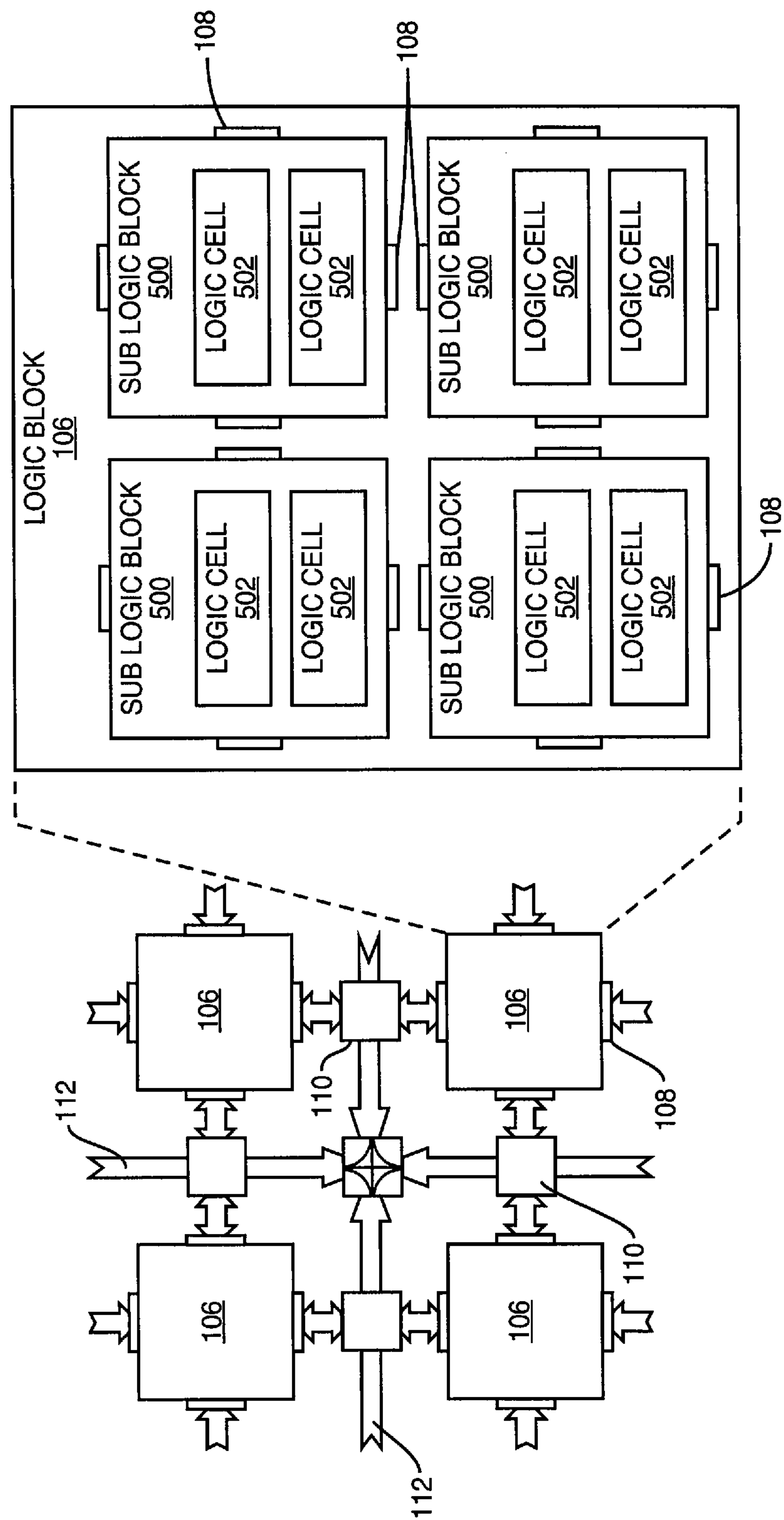
FIG. 5 illustrates an embodiment of communication control elements coupled to partitioned logic blocks of a secure programmable logic device.

FIG. 5 illustrates an embodiment of the interconnections formed between the logic blocks 106, CCEs 108 and the interconnect networks 112. The switch devices 110 interface the CCEs 108 to the interconnect networks 112. The switches 110 steer data over the interconnect networks 112 to the appropriate CCEs 108. The CCEs 108 move data back and forth between the interconnect networks 112 and the logic blocks 106. The logic blocks 106 can be programmed based on the authentication and partition information 116, 120 to perform basic logic functions such as AND, OR, XOR etc. and/or more complex combinational functions such as decoders, mathematical functions, etc. The logic blocks 106 may include memory elements, which can be flip-flops or more complete blocks of memory such as volatile or non-volatile memory components. The logic blocks 106 can be sub-divided into smaller logic sub-blocks 500 of logic cells 502. According to this embodiment, the CCEs 108 provide interconnection points between the sub-logic blocks 500 of each logic blocks 106 and between the logic blocks 106 and the switch devices 110. The FMU 114 configures the CCEs based on the partition information 120 so that desired interconnection paths are formed and undesirable interconnection paths are prevented.

Figure 6:
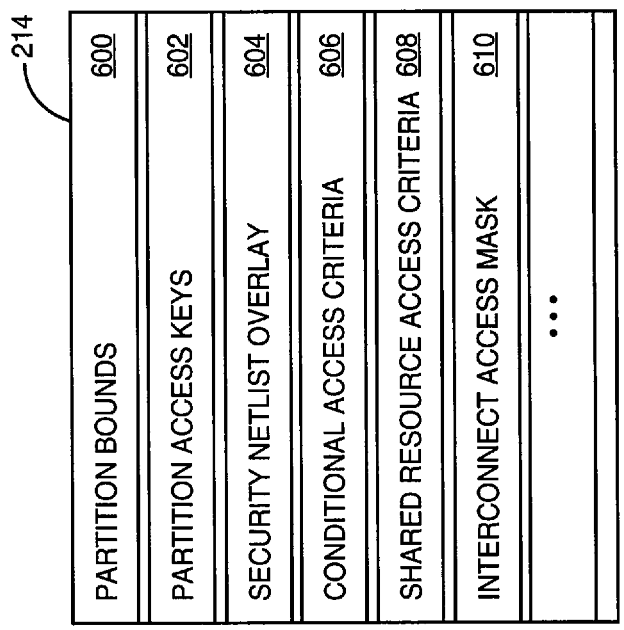
FIG. 6 illustrates an embodiment of a partition information table accessed by a logic unit of a secure programmable logic device.

FIG. 6 illustrates an embodiment of the partition information table 214 that stores the partition information used by the FMU 114 and CCEs 108. The designer can specify partition intent during the design process. In one embodiment, the designer's intent is captured in the partition information table 214 after the partitions 102, 104 have been placed and routed. The table 214 includes several entries for use by the FMU 114 during partition programming and operation of the programmable device 100. The first entry 600 determines the bounds placed on the logic blocks 106 during programming. The FMU 114 uses partition bound information to restrict programming to the logic blocks 106 allocated for a particular partition. The FMU 114 uses the second entry 602 of the table 214 to identify the entities that have access to the partitions 102, 104. In one embodiment, the second entry 602 stores keys for identifying the entities which have access to particular ones of the partitions 102, 104. If an unauthenticated entity attempts to access a secure partition, programming access is denied by the FMU 114. These keys can also be used to prevent unauthorized reading of the partition data.

A third entry 604 in the table 214 includes security netlist overlay data. The security netlist overlay data is used by the FMU 114 during run time and determines how the different partitions 102, 104 should be interconnected. In one embodiment, the security netlist overlay data determines how the partitions 102, 104 should be connected to the interconnect networks 112. For example, certain ones of the partitions 102, 104 may be prevented from accessing other partitions or shared resources. Other ones of the partitions 102, 104 may be prevented from accessing I/O pins (not shown) of the programmable device 100. The security netlist overlay data controls these types and other types of partition interconnections. In one embodiment, the security netlist overlay data determines which CCEs 108 and/or FMEs 400 are enabled and disabled. The FMU 114 configures the CCEs 108 and/or the FMEs 400 based on the security netlist overlay data according to this embodiment. As such, the FMU 114 can maintain restricted and secure partition connections during operation of the programmable device 100.

A fourth entry 606 in the partition information table 214 identifies conditional access criteria which can be used in conjunction with the security netlist overlay data to configure partition connections and restrictions. The FMU 114 can use the conditional access criteria to control and restrict partition-to-partition communication by enabling and disabling the appropriate CCEs 108. The FMU 114 can also use the conditional access criteria to enable and disable different ones of the FMEs 400 for monitoring purposes. The conditional access criteria can also be used to control and restrict partition-to-I/O communication. For example, which partitions are permitted access to I/Os of the programmable device 100, which I/Os are monitored for activity, which FMEs 400 are best suited to monitor I/O activity, etc. can be determined based on the conditional access criteria stored in the fourth entry 606 of the partition information table 214.

A fifth entry 608 in the table 214 identifies shared resource access criteria which can be used to determine how the different partitions 102, 104 access shared resources. The shared resource access criteria determines which partitions 102, 104 are permitted to communicate with shared resources (e.g., such as RAM, EEPROM/PROM/Flash memory, DSP blocks, etc.) located outside the partitions 102, 104 and which partitions 102, 104 are not permitted to communicate with shared resources. The shared resource access criteria can be used during partition programming and/or operation of the programmable device 100. The FMU 114 can control and restrict shared resource access. Alternatively, shared resource access control can be distributed amongst the FMU 114, CCEs 108 and/or the FMEs 400 based on the information stored in the fifth entry 608 of the partition information table 214.

A sixth entry 610 in the table 214 includes an interconnect access control mask. The interconnect access control mask enables the FMU 114 to prevent certain partitions 102, 104 from observing and/or driving communication resources associated with other partitions. The FMU 114 can perform communication resource management based on the interconnect access control mask at a global, regional, or local level within the programmable device fabric 100. Accordingly, the FMU 114 can control when the partitions 102, 104 gain access to certain network interconnect resources 110, 112 much the same way a memory management unit controls the use of bus resources in a memory system. The FMU 114 can perform arbitration between the different partitions 102, 104 so that the communication preferences indicated by the interconnect access control mask are implemented by the programmable device 100. The partition information table 214 can be organized as a single table for all partitions 102, 104 or a separate table for each partition or group of the partitions 102, 104.

Described next are various details relating to the design, programming and operation of the programmable logic device 100. During the design phase, a designer is permitted to specify and capture a particular partition intent. For example, the designer can isolate or connect partitions 102, 104 using certain criteria. The partition information 120 is downloaded to the programmable device 100, e.g., into the partition information table 214. Authentication information 116 can also be downloaded to the programmable device 100 at this point to indicate which entities should be granted programming access to the partitions 102, 104. Decryption information may also be downloaded to the programmable device 100 for enabling the FMU 114 to process encrypted programming data. The FMU 114 uses the authentication and partition information 116, 120 (and optional decryption information) during subsequent programming and operating phases to ensure that the designer's partition criteria are enforced, maintaining security and integrity within the system.

During the programming stage, the device 100 is programmed with the assistance of the FMU 114. The FMU 114 uses the authentication and partition information 116, 120 to perform various checks during programming. In one embodiment, programming data provided to the programmable device 100 is encrypted. According to this embodiment, the FMU 114 decrypts the programming data based on the decryption data stored by the programmable device 100. In other embodiments, the programming data may not be encrypted or only programming data associated with certain ones of the partitions 102, 104 may be encrypted. In each case, the FMU 114 enforces access rights to enable or disable partition programming based on the authentication information 116. The FMU 114 also performs bounds checking to ensure that programming data associated with one partition only affects the targeted partition and not other regions of the programmable device 100. Bounds checking may involve verifying and monitoring various boundary conditions such as interconnections between the partitions 102, 104, overlap between the partitions 102, 104, partition size, etc. The FMU 114 checks the interconnect configuration mask portion of the partition information 120 to identify specific common resources in the programmable device 100 which are reserved for a particular partition. The FMU 114 prevents programming data associated with other partitions from violating this reservation. The FMU 114 can also lock down certain ones of the partitions 102, 104 when the partition information 120 indicates that these partitions are not permitted to be subsequently reconfigured or can only be reconfigured a particular number of times.

During operation of the programmable device 100, the FMU 114, partition information table 214, CCEs 108 and/or FMEs 400 are used to implement static/pseudo-static control and monitoring of partition operation. Partition-to-partition and partition-to-I/O communications can be controlled and monitored. Access to shared resources can also be controlled and monitored. The FMU 114, partition information table 214, CCEs 108 and/or FMEs 400 also control and monitor fabric and partition integrity. This way, the designer's original partition intent is enforced throughout the design, programming and operation of the programmable device 100.

The FMU 114, partition information table 214, CCEs 108 and/or FMEs 400 are also used to control and monitor reprogramming/reconfiguring of the programmable device 100. The programmable device 100 can be partially or fully reconfigured during operation. In one embodiment, one or more of the partitions 102, 104 can be individually re-configured while the remainder of the programmable device 100 remains operational. According to this embodiment, the partitions 102, 104 that continue to operate while another partition is being reconfigured are designed to continue functional operation during the reprogramming. After authentication, the FMU 114 controls the CCEs 108 associated with the partition being reprogrammed so that the partition is isolated from the remainder of the programmable device 100. This prevents data corruption and exposure of secure data. After the programming is successfully completed, the FMU 114 re-enables the CCEs 108 according to the partition information 120, e.g., in accordance with the security netlist overlay data, the conditional access criteria, the shared resource access criteria, and/or the interconnect access mask. Upon re-enablement, the reprogrammed partition resumes normal functional operation. Accordingly, different ones of the partitions 102, 104 can be reprogrammed to improve or expand functionality of the programmable device 100 or to correct errors all while the FMU 114 maintains the designer's original partition intent.

As explained previously, the FMU 114 can be centralized or distributed. The FMU 114 can be programmed and primed in different stages. In one embodiment, the FMU base firmware is programmed in a secure factory setting. The FMU base firmware can include a state machine (which can be customer-specific), protocols and a unique FMU structure. The FMU base firmware can also include a master key for permitting general access to the FMU 114 and optional partition programming keys for authenticating programming access to different ones of the partitions 102, 104, both as previously described herein. Hardware and/or software can be provided as part of the FMU base firmware. The firmware may also identify customer-specific levels of security. At the customer site, the partition information 120 is securely uploaded to the programmable device 100, e.g., into memory 118, the partition information table 214 or both. The entity attempting to upload the partition information 120 is authenticated against the master key before the FMU 114 permits uploading of the partition information 120. This way, only verified entities are allowed to provide the partition information 120 via a secure communication with the FMU 113. In addition, the secure communication path with the FMU 114 enables the programmer to secure and protect the FMU 114 itself, e.g., by implementing the FMU 114 in secure flash or non-volatile memory or by programming a secure microcontroller component of the programmable device 100 to carry out the FMU operations. Once the FMU 114 is authenticated, the programmable device 100 is now ready to undergo full or partial bit stream programming. This can include updating the partition information table 214 and/or loading the partition programming key(s) into the FMU 114 or the partition information table 214.

Accordingly, when the programmable device 100 is programmed in a less secure environment, the secure FMU 114 can perform rights checking by validating the per-partition access keys stored in memory 116 or the partition information table 214. The FMU 114 uses the key information to validate that programming or re-programming is allowed for the corresponding partition 102, 104. The FMU 114 also performs bounds checking and interconnect configuration mask checking on incoming programming bit streams as described above. The FMU can include a counter to track the number of licenses used and control the IP subscription model.

After the programmable device 100 is successfully programmed, the partitions 102, 104 can be enabled for regular operation. The CCEs 108 isolate the different partitions 102, 104. The FMU 114 controls the CCEs 108 during operation based on the partition information 120 to enforce the designer's partition intent. In one embodiment, the interconnect networks 112 can be enabled after the partitions 102, 104 are successfully programmed. The interconnect networks 112 coupled to a particular partition 102, 104 can be disabled when that partition enters a standby mode or is ready for re-configuration. The FMU 114 can control the CCEs 108 so that access to one or more resources (e.g., blocks of memory) is enabled or blocked during run time.

The FMU 114 supports one or more operation mode keys, symmetric encryption algorithms and some interface to communicate with the partitions 102, 104. The partitions 102, 104 implement a secure protocol to communicate over this interface. For example, one or more of the interconnect networks 112 can implement a secure protocol. The designer provides an authentication and/or encryption key used by the FMU 114 to authenticate partition requests over the secure interface. The FMU 114 configures the appropriate CCEs 108 responsive to the requests. This way, the partitions 102, 104 can gain access to a bus or shared resource via the configured CCEs 108.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A method of operating a programmable logic device having a logic unit implemented in hardware and a plurality of logic blocks grouped into two or more programmed partitions, comprising:

authenticating external access to one or more of the two or more partitions via the logic unit based on authentication information stored by the programmable logic device;

controlling reprogramming of the two or more partitions via the logic unit based on at least some partition information stored by the programmable logic device by selectively allowing programming access to a first one of the programmed partitions while preventing programming access to a second one of the programmable partitions, based on the partition information; and controlling interconnection and operation of the one or more partitions during operation of the programmable logic device via the logic unit based on at least some of the partition information.

2. The method of claim 1, wherein the authentication information comprises at least one master authentication key and one or more programming authentication keys.

3. The method of claim 2, further comprising controlling storage or modification of the partition information via the logic unit based on the at least one master authentication key and controlling external access to the two or more partitions via the logic unit based on the one or more programming authentication keys.

4. The method of claim 1, further comprising determining whether one or more rules indicated by the partition information are violated during operation of the programmable logic device via the logic unit.

5. The method of claim 1, further comprising tracking usage of a functional module associated with one or more of the partitions during operation of the programmable logic device via the logic unit.

6. The method of claim 1, wherein controlling reprogramming of the two or more partitions via the logic unit based on at least some of the partition information comprises preventing the reprogramming of a partition after the partition has been programmed a predetermined number of times.

7. The method of claim 1, wherein controlling interconnection and operation of the two or more partitions during operation of the programmable logic device via the logic unit based on at least some of the partition information comprises isolating a partition from another partition.

8. The method of claim 1, wherein controlling interconnection and operation of the two or more partitions during operation of the programmable logic device via the logic unit based on at least some of the partition information comprises isolating a partition from a shared resource of the programmable logic device.

9. The method of claim 1, wherein controlling interconnection and operation of the two or more partitions during operation of the programmable logic device via the logic unit based on at least some of the partition information comprises isolating a partition from an input/output device of the programmable logic device.

10. The method of claim 1, wherein controlling interconnection and operation of the two or more partitions during operation of the programmable logic device via the logic unit based on at least some of the partition information comprises preventing a partition from accessing a communication resource of another partition.

11. The method of claim 1, wherein controlling interconnection and operation of the two or more partitions during operation of the programmable logic device via the logic unit based on at least some of the partition information comprises controlling how the one or more partitions are connected to a plurality of interconnect networks included in the programmable logic device.

12. The method of claim 1, wherein controlling reprogramming of the two or more partitions via the logic unit based on at least some of the partition information comprises:
- isolating a partition from the other partitions during operation of the programmable logic device;
- reprogramming the isolated partition; and
- re-connecting the isolated partition to the other partitions after the reprogramming is completed.

13. A programmable logic device, comprising:
- a plurality of logic blocks grouped into two or more programmed partitions;
- memory configured to store authentication information and partition information;
- a plurality of connection control elements operable to controllably interconnect different ones of the logic blocks; and
- a logic unit implemented in hardware and configured to control external access to the two or more partitions based on the authentication information, control reprogramming of the one or more partitions based on at least some of the partition information by selectively allowing programming access to a first one of the programmed partitions while preventing programming access to a second one of the programmable partitions, based on the partition information, and configure the connection control elements based on at least some of the partition information.

14. The programmable logic device of claim 13, wherein the authentication information comprises at least one master authentication key and one or more programming authentication keys.

15. The programmable logic device of claim 14, wherein the logic unit is configured to control storage or modification of the partition information based on the at least one master authentication key and control external access to the one or more partitions based on the one or more programming authentication keys.

16. The programmable logic device of claim 13, further comprising a plurality of monitoring elements configured to determine whether one or more rules indicated by the partition information are violated during operation of the programmable logic device.

17. The programmable logic device of claim 16, wherein the logic unit is configured to configure the monitoring elements based on at least some of the partition information.

18. The programmable logic device of claim 13, wherein the partition information is stored in one or more tables accessible by the logic unit.

19. The programmable logic device of claim 13, wherein the logic unit is configured to track usage of a functional module associated with one or more of the partitions during operation of the programmable logic device.

20. The programmable logic device of claim 13, wherein the logic unit is configured to prevent the reprogramming of a partition after the partition has been programmed a predetermined number of times.

21. The programmable logic device of claim 13, wherein the logic unit is configured to isolate a partition from another partition based on at least some of the partition information.

22. The programmable logic device of claim 13, wherein the logic unit is configured to isolate a partition from a shared resource of the programmable logic device based on at least some of the partition information.

23. The programmable logic device of claim 13, wherein the logic unit is configured to isolate a partition from an input/output device of the programmable logic device based on at least some of the partition information.

24. The programmable logic device of claim 13, wherein the logic unit is configured to prevent a partition from accessing a communication resource of another partition based on at least some of the partition information.

25. The programmable logic device of claim 13, wherein the logic unit is configured to control how the two or more partitions are connected to a plurality of interconnect networks included in the programmable logic device.

26. The programmable logic device of claim 13, wherein the logic unit is configured to isolate a partition from the other partitions during operation of the programmable logic device, reprogram the isolated partition and re-connect the isolated partition to the other partitions after the reprogramming is completed.

27. The programmable logic device of claim 26, wherein the logic unit is configured to disable the connection control elements coupled to the partition being reprogrammed while the partition is reprogrammed and re-enable the disabled connection control elements after the reprogramming is completed.

* * * * *

UNITED STATES PATENT AND TRADEMARK OFFICE

CERTIFICATE OF CORRECTION

PATENT NO. : 8,984,300 B2
APPLICATION NO. : 12/363903
DATED : March 17, 2015
INVENTOR(S) : J. Borchert et al.

It is certified that error appears in the above-identified patent and that said Letters Patent is hereby corrected as shown below:

Title Page/Other Publications, References Cited, page 2, column 2, line 50, please change "Generationin Configuration" to -- Generation in Configuration --

Signed and Sealed this
Eighteenth Day of August, 2015

Michelle K. Lee
*Director of the United States Patent and Trademark Office*